(12) United States Patent
Moleyar et al.

(10) Patent No.: US 7,693,075 B2
(45) Date of Patent: Apr. 6, 2010

(54) UPDATING ADDRESS TABLES

(75) Inventors: Prabhanjan Moleyar, Karnataka (IN); Suryakant Maharana, Karnakata (IN)

(73) Assignee: Intel Corporation, Santa Clara, CA (US)

( * ) Notice: Subject to any disclaimer, the term of this patent is extended or adjusted under 35 U.S.C. 154(b) by 1836 days.

(21) Appl. No.: 10/746,271

(22) Filed: Dec. 24, 2003

(65) Prior Publication Data

US 2005/0147111 A1 Jul. 7, 2005

(51) Int. Cl.
G08C 15/00 (2006.01)
(52) U.S. Cl. ...................................... 370/241
(58) Field of Classification Search ................ 370/389, 370/395.52, 235, 392, 412, 401, 241; 711/124, 711/146
See application file for complete search history.

(56) References Cited

U.S. PATENT DOCUMENTS

| | | | | |
|---|---|---|---|---|
| 4,342,079 A | * | 7/1982 | Stewart et al. | 711/5 |
| 5,909,686 A | * | 6/1999 | Muller et al. | 707/104.1 |
| 2003/0174699 A1 | * | 9/2003 | Van Asten et al. | 370/389 |
| 2004/0165609 A1 | * | 8/2004 | Herbst et al. | 370/412 |
| 2005/0232278 A1 | * | 10/2005 | Anderson | 370/395.52 |
| 2006/0126624 A1 | * | 6/2006 | Yazaki et al. | 370/389 |
| 2006/0159019 A1 | * | 7/2006 | Buskirk et al. | 370/235 |
| 2007/0002862 A1 | * | 1/2007 | Kanekar et al. | 370/392 |

* cited by examiner

Primary Examiner—Kevin C Harper
(74) Attorney, Agent, or Firm—Fish & Richardson P.C.

(57) ABSTRACT

A method includes storing an address in an entry of a first memory device that is accessible by an address manager while the address is being stored in an entry of a second memory device included in a packet-forwarding device.

20 Claims, 5 Drawing Sheets

UPDATING ADDRESS TABLES

BACKGROUND

Network switches, routers, and the like are used to distribute information through networks by sending the information in segments such as packets. A packet typically includes a "header" that stores a destination address for delivering the packet and a "payload" that stores a segment of information being sent through the network. To forward the packet to the appropriate destination, a network switch compares the destination address stored in the header to addresses stored in entries of an address table. By matching the destination address to one of the table entries, the network switch identifies the appropriate switch port to transmit the packet. If a match is not found, the network switch transmits the packet on one or more of the switch ports in an operation know as "flooding".

DESCRIPTION

Figure 1:
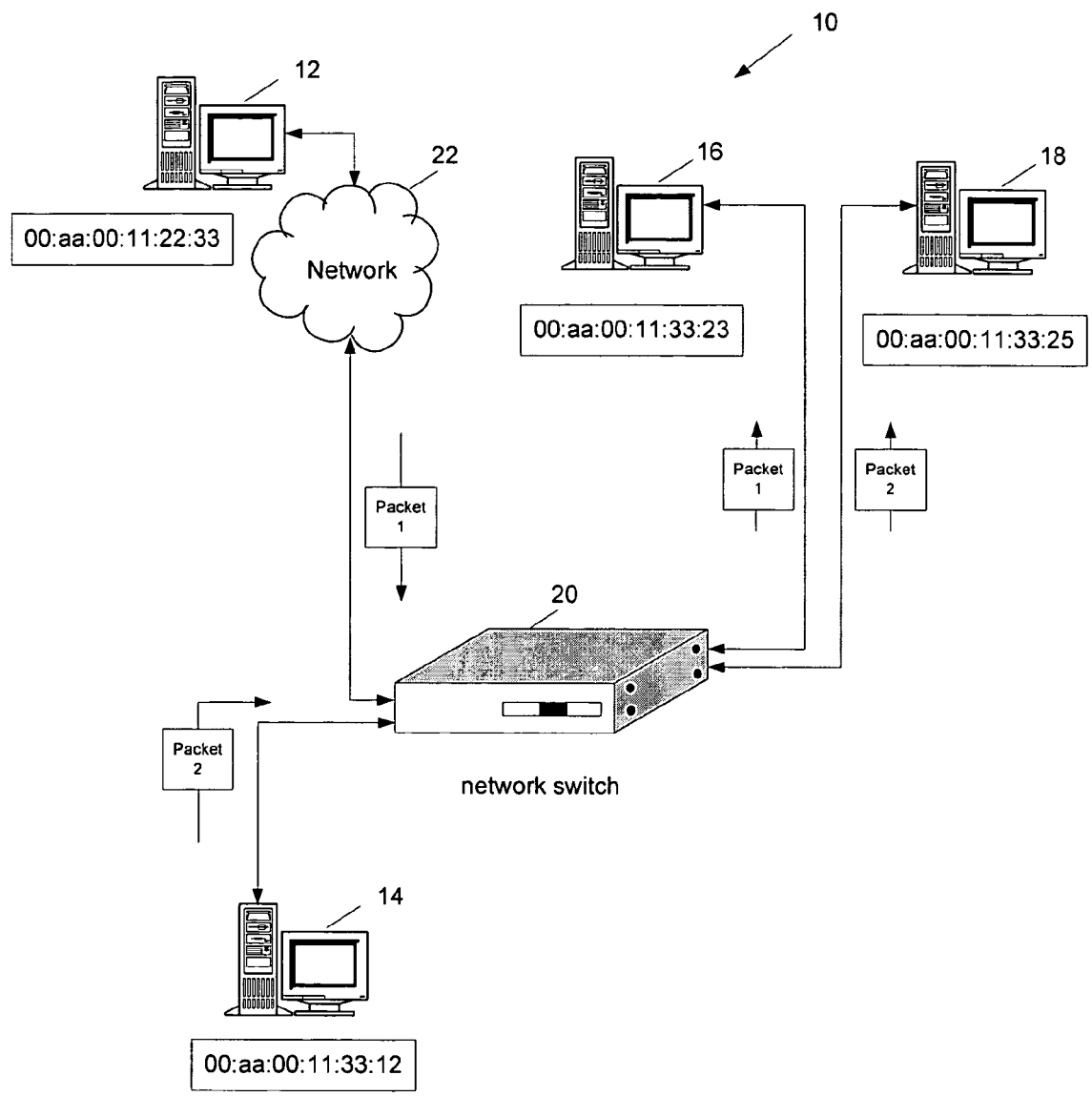
FIG. 1 is a block diagram depicting a system for forwarding packets.

Referring to FIG. 1, a system 10 for transmitting packets among computer systems 12, 14, 16, 18 includes a network switch 20 that directs the packets to their appropriate destinations. However, in other arrangements a router or other packet-forwarding device is used individually or in combination to distribute packets among the computer systems. In this particular example, computer system 12 connects to the network switch 20 through a network 22 (e.g., the Internet, a wide area network (WAN), etc.) while computer systems 14, 16, and 18 are in direct communication with the network switch 20 and form a local area network (LAN). While the system 10 uses network 22 and the LAN formed by computer systems 14, 16, and 18, in other arrangements the system 10 may implement other networking techniques (e.g., wireless network links, global networks, etc.) for delivering packets.

In this particular example the network switch 20 directs packet 1 from computer system 12 to computer system 16 and packet 2 from computer system 14 to computer system 18. To direct each packet to the appropriate destination, the network switch 20 uses respective source and destination addresses that are stored in packets 1 and 2, and which identify computer systems in the system 10. For example, packet 1 stores a source Layer 2 or source Media Access Control (MAC) address (e.g., 00:aa:00:11:22:33) that identifies computer system 12 as the packet source and a destination MAC address (e.g., 00:aa:00:11:33:23) that identifies computer system 16 as the packet destination. Similarly packet 2 stores a source MAC address (e.g., 00:aa:00:11:33:12) and a destination MAC address (e.g., 00:aa:00:11:33:25) for the network switch 20 to send the packet from computer system 14 to computer system 18. In this example, each of the computer systems 12, 14, 16, 18 are identified by MAC addresses that typically are represented as 48-bit numbers and are expressed as six hexadecimal numbers, each representing eight bits, separated by colons. However, in other arrangements the computer systems 12, 14, 16, 18 are identified by other addressing schemes.

Figure 2:
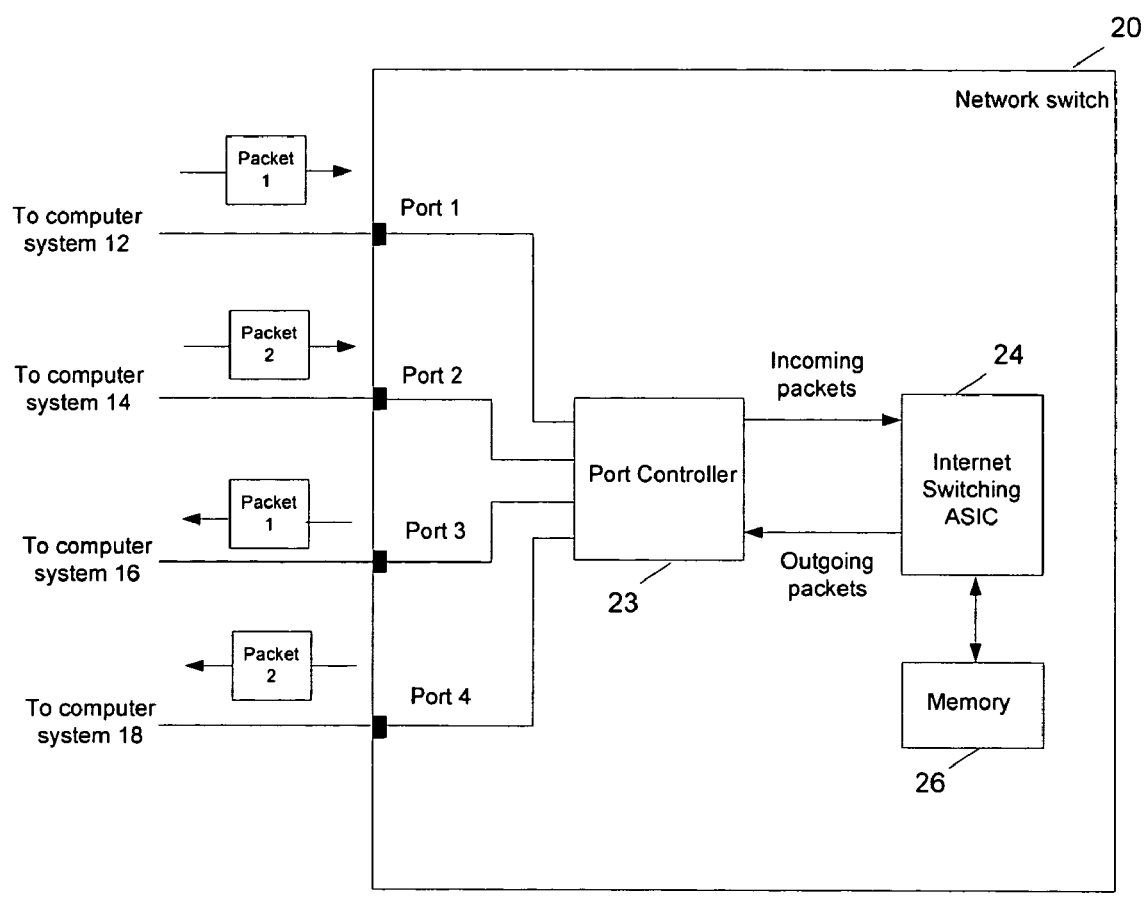
FIG. 2 is a block diagram depicting a network switch.

Referring to FIG. 2, the network switch 20 includes, e.g., four ports that provide a physical link to the computer systems 14, 16, 18 and the network 22 along with the capability to receive and transmit packets. In this particular example each of the computer systems 12, 14, 16, 18 are in communication with a separate port, however, in some arrangements, two or more computer systems are in communication with the same port. Each of the four ports are in communication with a port controller 23 that collects incoming packets from the ports along with passing outgoing packets to one or more appropriate ports to deliver packets. In some arrangements, the port controller 23 includes a peripheral interface controller (PIC) for establishing an interface with the devices (e.g., computer systems 14-18, network 22, etc.) in communication with the network switch 20.

The network switch 20 also includes an Internet switching application-specific integrated circuit (ASIC) 24, which is a microchip designed for directing packets received by the network switch to their appropriate destination. For example, after receiving packet 1 on port 1, the packet is passed from the port controller 23 to the Internet switching ASIC 24 to determine the particular port (e.g., port 3) to transmit the packet for delivery to its intended destination (e.g., computer system 16). Typically, as packets are received, the network switch 20 stores the packets in a memory 26 (e.g., random access memory (RAM), static random access memory SRAM, dynamic random access memory (DRAM), etc.) that is in communication with the Internet switching ASIC 24. By storing the packets in the memory 26, the Internet switching ASIC 24 can access the memory to retrieve one or more packets to determine each intended packet destination or to perform another operation associated with the received packets. Also, in some arrangements the port controller 23 and the memory 26 are included in the Internet switching ASIC 24 individually or in combination.

In general, to forward received packets, the Internet switching ASIC 24 accesses and retrieves one or more destination addresses stored in the packet header and determines the particular port(s) to use for transmitting the packet. If the Internet switching ASIC 24 cannot determine the destination of the packet, the port controller 23 may transmit the packet on one or more of the ports. For example, if the Internet switching ASIC 24 does not recognize the intended destination MAC address stored in the header of packet 1, the port controller 23 transmits the packet on ports 1-4 so that each computer system, which may be the intended destination, receives a copy of packet 1. Broadcasting a packet on one or more of the ports is typically referred to as "flooding" and consumes the bandwidth of the network switch 20 ports since some packets are forwarded on ports that are not in communication with the intended destination of the packet.

Figure 3:
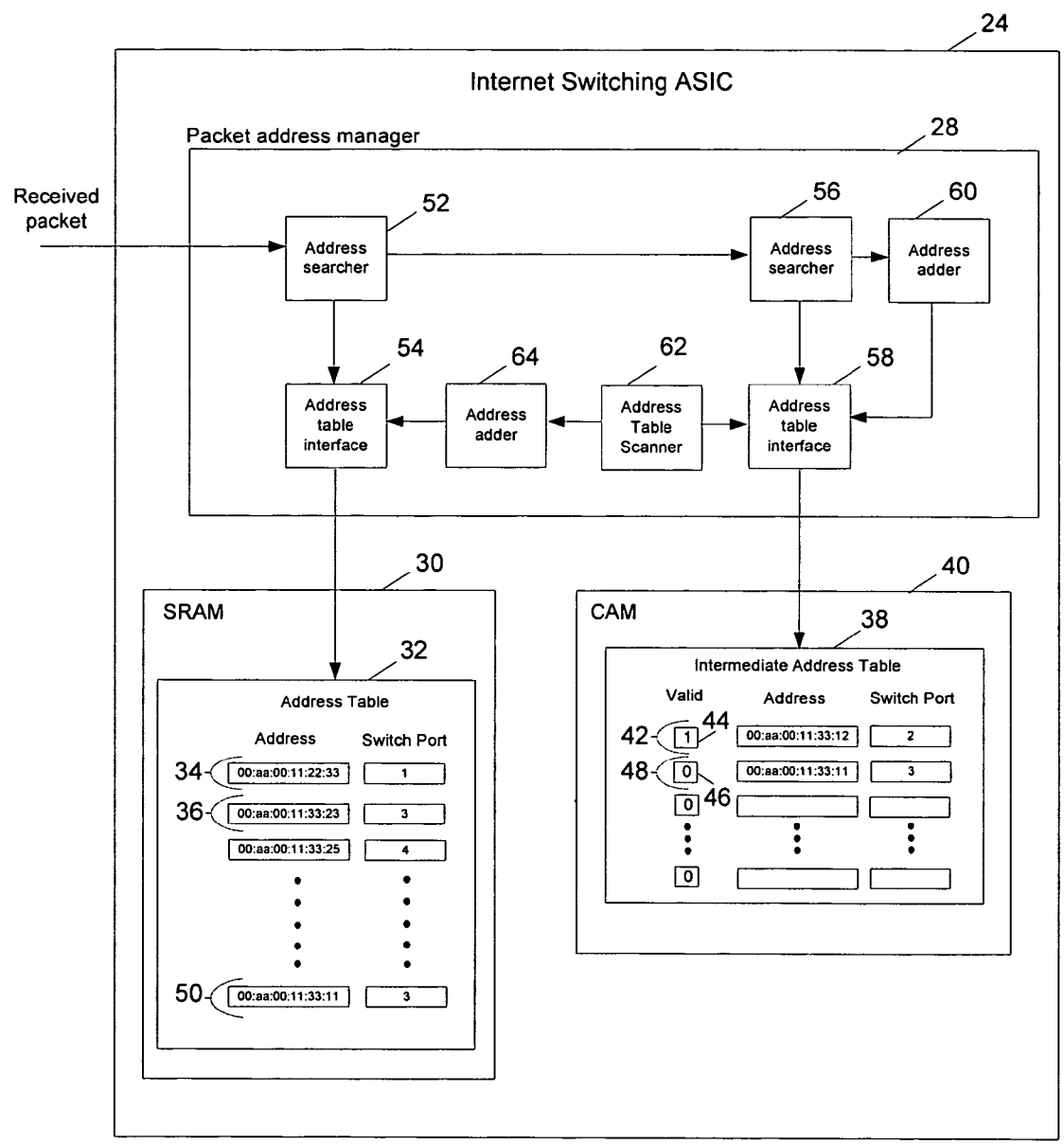
FIG. 3 is a block diagram depicting a portion of an Internet switching application-specific integrated circuit (ASIC).

Referring to FIG. 3, the Internet switching ASIC 24 includes a packet address manager 28 that receives packets from the port controller 23 or the memory 26 and determines the one or more ports to transmit the respective packets on for delivery to their intended destination(s). In this particular example, the packet address manager 28 is implemented in the hardware of the Internet switching ASIC 24, however, in some arrangements the operations of the packet address manager are performed by a processor (e.g., a microprocessor, etc.) that executes instructions stored in a memory (e.g., RAM, SRAM, DRAM, read only memory (ROM), etc.) or a storage device (e.g., hard drive, CD-COM, etc.) that is in communication with the processor.

The Internet switching ASIC 24 also includes SRAM memory 30 that stores an address table 32 that includes entries for storing the MAC addresses of each computer system, or another device (e.g., server, personal digital assistant, etc.) that sends a packet to or receives a packet from the network switch 20. However, in other arrangements the address table 32 is stored in a different type of memory (e.g., DRAM, a content-addressable-memory, etc.). In this particular example address table 32 includes entries respectively storing the MAC addresses associated with computer systems 12, 16, and 18 along with MAC addresses of another device (not shown) in communication with the network switch 20. Each entry of the address table 32 also includes a value that identifies the particular port of the network switch 20 that is in communication with the computer system or other device associated with the MAC address stored in the entry. For example, one entry 34, which stores the MAC address of computer system 12, also stores the value "1" to indicate that network switch port 1 is in communication with computer system 12. By storing the MAC address and port number pairs in the address table 32, the packet address manager 28 can determine which particular port to use for forwarding a packet by matching the intended destination address stored in the packet to one of the addresses stored in the address table 32. Thus, to direct packet 1 to computer system 16, the packet address manager 28 attempts to match the destination MAC address (e.g. 00:aa:00:11:33:23) stored in the packet to the table entries to determine the port (e.g., port 3) to use for delivering packet 1. Here, the destination MAC address stored in packet 1 matches the MAC address stored in table entry 36. Due to this match, packet 1 is forwarded on port 3 for delivery to computer system 16.

Along with storing an intended destination MAC address, packet headers can store the MAC address of the computer system that sent the packet, which is referred to as the source MAC address. In some arrangements, the network switch 20 receives a packet that stores a source MAC address that is not included in one of the address table 32 entries. In such a scenario, the source MAC address is retrieved from the packet and stored in a new entry added to the address table 32. Such an operation is referred to as "learning". Also, since the packet arrived on a particular network switch port, the arrival port number is also stored in the table entry with the source MAC address. In the example above none of the address table 32 entries store the MAC address associated with computer system 14. Thus, when packet 2 is received by the network switch on port 2, the associated source MAC address (e.g., 00:aa:00:11:33:12) is stored in the address table 32 along with the port number (e.g., 2) that received packet 2. Since received packets with intended destination MAC addresses that are not stored in address table 32 are "flooded" on one or more of the network switch ports, "learning" source MAC addresses relatively quickly reduces the probability of "flooding".

Typically, the address table 32 includes a large number of entries (e.g., tens of thousands, etc.) that use significant memory space (e.g., 128 Kbytes) in the Internet switching ASIC 24. With such sizable address tables, adding an entry to the table takes a significant amount of time. Due to this latency to have a MAC address and port number entered into the address table 32, as packets are received that need to be forwarded to the MAC address being added, the packets are "flooded" onto one or more of the network switch ports since the MAC address and port number have not yet been included in the address table.

To reduce "flooding" caused by the latency incurred to add a MAC address to the table address 32, the Internet switching ASIC 24 includes an intermediate address table 38. In this example, the intermediate address table uses entries of a content-addressable-memory (CAM) 40. While CAMs such as CAM 40 typically cost more than SRAM, the CAM entries are accessible in parallel, therefore searching the CAM entries takes less time than searching through the entries of address table 32 stored in the SRAM 30. However, in some arrangements the intermediate address table 38 is stored in other types of memory such as a relatively small SRAM, a register file (e.g., with 16-64 entries), or other type of memory.

By storing MAC addresses in the CAM 40 while the same MAC addresses are being stored in the SRAM 30, the packet address manager 28 can use the intermediate address table 38 in the CAM to determine the appropriate port(s) for forwarding a packet. Thus, after packet 2 is received by the network switch, the source MAC address (e.g., 00:aa:00:11:33:12) stored in the packet and the receiving port (e.g., port 2) are stored in intermediate address table 38 entry 42 while the MAC address and port number are stored in the address table 32 stored in the SRAM 30.

Due to the ability to access entries in parallel, the CAM 40 supports fewer entries than the SRAM 30. Typically, the intermediate address table 38 includes, e.g., sixteen entries, however in other arrangements, the CAM 40 supports an intermediate address table with more or less entries. Furthermore, since data is written to the CAM 40 by finding an available entry, adding an entry to the intermediate address table 38 is completed relatively quickly compared to the time period needed to complete the tasks (e.g., search for a proper location to insert the data, update associated data structures, etc.) associated with adding an entry to the address table 32 in the SRAM 30.

In this arrangement, each intermediate address table 38 entry includes an indicator that stores a binary value to represent if the MAC address and port number stored in the entry have been stored in the address table 32. Indicator 44 included in entry 42 stores a binary value "1" to represent that the MAC address (e.g., 00:aa:00:11:33:12) and the port number (e.g. 2) in the entry 42 have not been stored in the address table 32. Alternatively, indicator 46 included in entry 48 stores a binary value "0" to represent that the MAC address (e.g., 00:aa:00:11:33:11) and the port number (e.g., 3) have been stored in entry 50 of the address table 32. By monitoring the value stored in each of the indicators, the packet address manager 28 determines if the entry contents (e.g., MAC address and port number) have been stored in the address table 32 and the intermediate address table 38 entry can be cleared for storing another MAC address and port number.

To manage the contents of the address table 32 and the intermediate address table 38, the packet address manager 28 includes an address searcher 52 that is passed packets received by the network switch 20. The address searcher 52 extracts the source and destination MAC addresses from the received packets to determine if the addresses are stored in the address table 32. To search the entries of the address table 32, the address searcher 52 uses an address table interface 54 that accesses the address table to determine if the address table is storing an MAC address that matches the source or destination MAC addresses stored in the packet. If the destination MAC address is found in the address table 32, the port number stored in the address table entry with the MAC address is retrieved and used to forward the packet on the port to the destination MAC address. Also, if the source MAC address is found in the address table 32, the source MAC address has already been learned, and there is no need to add another entry in the address table 32.

If the either the source or destination MAC addresses are not stored in the address table 32, the absent MAC address or MAC addresses are passed to an address searcher 56 that accesses the intermediate address table 38 through another address table interface 58. The intermediate address table 38 is stored in the CAM 40 and the entries are compared in parallel to the address or addresses passed to the address searcher 56. If, for example, a destination MAC address does not match any of the entries of the intermediate table address 38, the packet is "flooded" on one or more of the network switch 20 ports 1-4. In another example, if a source MAC address does not match any of the entries of the intermediate address table 38, the source MAC address is passed to an address adder 60 that uses the address table interface 58 to store the source MAC address and associated port number in the intermediate address table 38.

By placing the MAC address and port number in the intermediate address table 38, the MAC address is used to forward packets during the time period that the MAC address and port number are being stored on the address table 32. By allowing these addresses to be used during this latency period, the probability that a packet destined for this MAC address will be "flooded" onto one or more of the ports is reduced since the packet address manager 28 can determine the particular transmission port from the intermediate address table 38 prior to it being added to the address table 32 in SRAM 30.

To store a MAC address in the address table 32, which is presently stored in the intermediate address table 38, the packet address manager 28 includes an address table scanner 62 that uses the address table interface 58 to access the intermediate address table 38. By accessing the intermediate address table 38, the address table scanner 62 checks the table entries to determine if one or more MAC addresses have been added to the intermediate address table that have not been added to or are not being added to the address table 32. In this arrangement, the address table scanner 62 checks the indicators included in each intermediate address table entry to determine whether or not the associated MAC address has been or is being stored in the address table 32. For example, an indicator storing binary value "1", such as indicator 44, represents that the associated MAC address and port number have not been stored on the address table 32. Alternatively, an indicator storing binary value "0", such as indicator 46, represents that the associated MAC address and port number have been or are being stored in the address table 32 by an address adder 64 and the entry can be cleared to store another MAC address.

Figure 4:
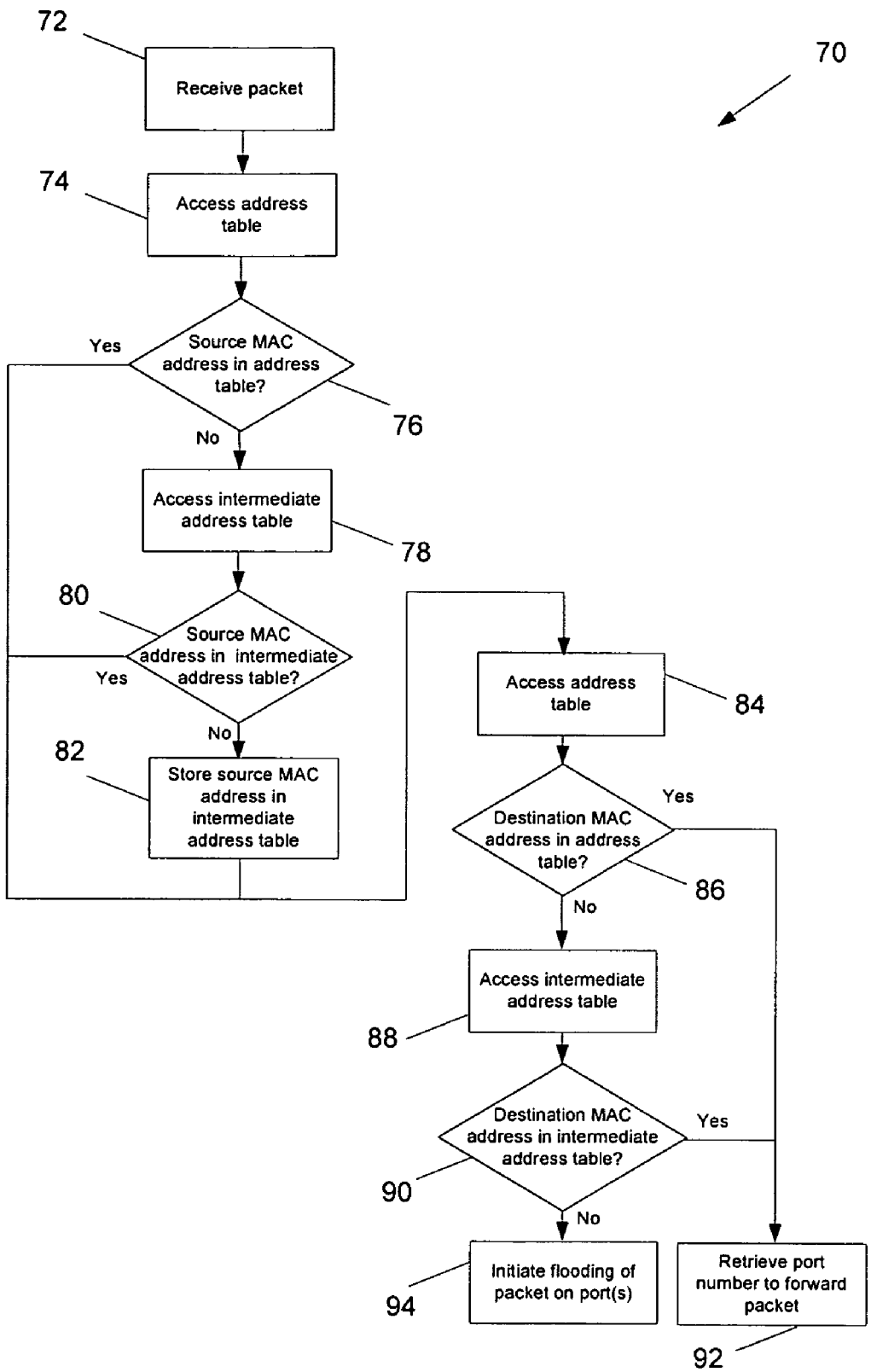
FIG. 4 is a flow chart of a portion of a packet address manager.

Referring to FIG. 4, a portion of a packet address manager 70, such as the address manager 28 implemented in the hardware of the Internet switching ASIC 24, includes receiving 72 a packet. Typically, the received packet includes a header that stores the source MAC address of the computer system that sent the packet and a destination MAC address associated with the computer system that the packet is intended for delivery. After receiving the packet, the packet address manager 70 accesses 74 an address table, such as the address table 32, and determines 76 if the source MAC address stored in the packet header is stored in the address table. If the source MAC address is not stored in the address table, the packet address manager 70 accesses 78 an intermediate address table, such as intermediate address table 38, and determines 80 if the source MAC address is stored in the intermediate address table. If the source MAC address is not stored in the intermediate address table, the address manager 70 stores 82 the source MAC address in the intermediate address table.

If the source MAC address is stored in the address table or in the intermediate address table, there is no need to re-learn the source MAC address and the packet address manager 70 accesses 84 the address table and determines 86 if the destination MAC address is stored in the address table. If the destination MAC address is not stored in the address table, the packet address manager 70 accesses 88 the intermediate address table and determines 90 if the destination MAC address is stored in the intermediate address table. If the destination MAC address is stored in the address table or in the intermediate address table, the address manager 70 retrieves 92 the port number stored with the destination MAC address for forwarding the packet to the intended destination. If the destination MAC address is not stored in the intermediate address table, the packet address manager 70 initiates 94 "flooding" of the packet on one or more of the ports of the packet-forwarding device (e.g., network switch 20).

Figure 5:
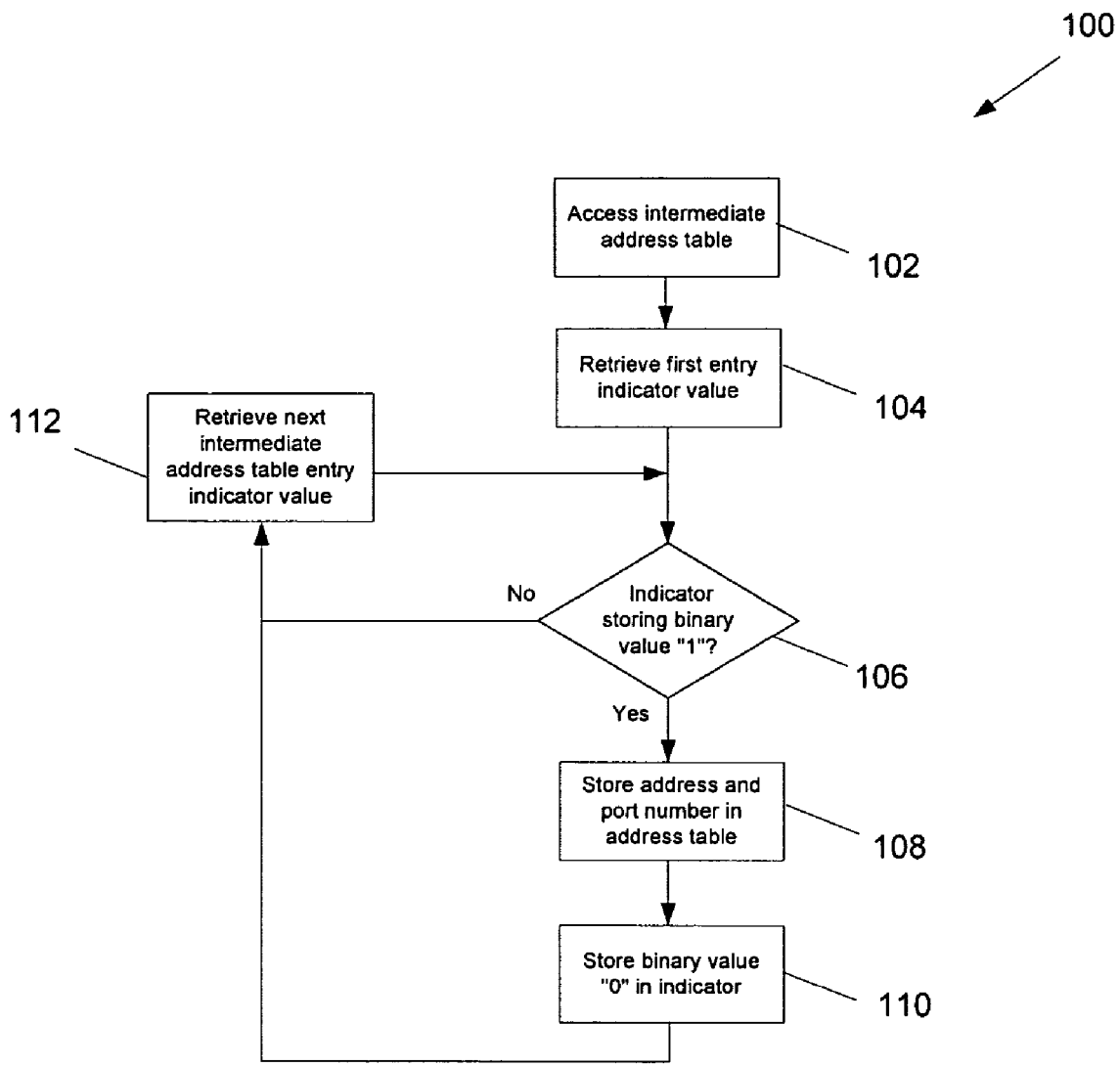
FIG. 5 is a flow chart of another portion of a packet address manager.

Referring to FIG. 5, another portion of a packet address manager 100 includes accessing 102 an intermediate address table such as intermediate address table 38. In some arrangements, the intermediate address table 38 is accessed with an interface such as the address table interface 58 in the Internet switching ASIC 24. The packet address manager 100 retrieves 104 the binary value stored in the indicator of the first entry of the intermediate address table. The address manager 100 determines 106 if the retrieved value is binary value "1", which represents that the MAC address stored in the table entry needs to be stored an address table such as address table 32. If the retrieved value is binary value "1", the packet address manager 100 stores 108 the MAC address and port number in the address table. After the MAC address is stored, the address manager 100 stores 110 a binary value "0" in the indicator to represent that the MAC address and port have been stored in the address table and the intermediate address table entry can be cleared and used to store another MAC address included in a received packet. After storing the binary value "0" or if the retrieved indicator is not storing a binary value "1" (e.g., is storing a binary value "0"), the address manager 100 retrieves 112 the binary value stored in the indicator associated with the next intermediate address table entry and returns to determine if this next entry is storing an MAC address and port number that needs to be stored in the address table. In some arrangements, the address manager 100 checks the indicators associated with each entry and then cycles back to the indicator associated with the first table entry and repeats checking in a cyclical fashion so that the intermediate address table entries are cleared when the MAC address and port number are stored in the address table.

Particular embodiments have been described, however other embodiments are within the scope of the following claims. For example, the operations of the address manager 28 can be performed in a different order and still achieve desirable results.

What is claimed is:

1. A computer implemented method comprising:
storing, by a computing device, an address in an entry of a first memory device that is accessible by an address manager while the address is being stored in an entry of a second memory device included in a packet-forwarding device; and
monitoring, by the computing device, an indicator in the entry of the first memory device representing if the address has been stored in the entry of the second memory device.

2. The method of claim 1 further comprising:
storing, by the computing device, in the entry of the first memory device, a number representing a port included in the packet-forwarding device.

3. The method of claim 1 wherein the first memory device includes a content-addressable-memory (CAM).

4. The method of claim 1 wherein the second memory device includes a static random access memory (SRAM).

5. The method of claim 1 wherein the address includes a Media Access Control (MAC) address extracted from a packet.

6. The method of claim 1 wherein the first memory device and the second memory device are in a network switch.

7. A computer-readable medium comprising executable instructions, the executable instructions being executable by a processor to cause a machine to:
   store an address in an entry of a first memory device that is accessible by an address manager while the address is being stored in an entry of a second memory device included in a packet-forwarding device; and
   monitor an indicator in the entry of the first memory device representing if the address has been stored in the entry of the second memory device.

8. The computer-readable medium of claim 7 wherein the instructions cause a machine to:
   store in the entry of the first memory device a number representing a port included in the packet-forwarding device.

9. The computer-readable medium of claim 7 wherein the first memory device includes a content-addressable-memory (CAM).

10. The computer-readable medium of claim 7 wherein the second memory device includes a static random access memory (SRAM).

11. The computer-readable medium of claim 7 wherein the address includes a Media Access Control (MAC) address extracted from a packet.

12. The computer-readable medium of claim 7 wherein the first memory device and the second memory device are in a network switch.

13. An apparatus comprising: a processor configured to:
   store an address in an entry of a first memory device that is accessible by an address manager while the address is being stored in an entry of a second memory device included in a packet-forwarding device; and
   monitor an indicator in the entry of the first memory device representing if the address has been stored in the entry of the second memory device.

14. The apparatus of claim 13 wherein the processor is further configured to store, in the entry of the first memory device, a number representing a port included in the packet-forwarding device.

15. A system comprising:
   a first memory device capable of,
   storing an address in an entry of the first memory device that is accessible by an address manager while the address is being stored in an entry of a second memory device included a packet-forwarding device; and
   storing an indicator in the entry of the first memory device representing if the address has been stored in the entry of the second memory device.

16. The system of claim 15 wherein the first memory device is further capable of:
   storing in the entry a number representing a port included in the packet-forwarding device.

17. A packet-forwarding device comprising:
   an input port for receiving a packet;
   an output port for delivering the received packet; and
   a first memory device capable of,
   storing an address extracted from the packet in an entry that is accessible by an address manager while the address is being stored in an entry of a second memory device included the packet-forwarding device; and
   storing an indicator in the entry representing if the address has been stored in the entry of the second memory device.

18. The packet-forwarding device of claim 17 wherein the first memory device is further capable of: storing in the entry a number representing the input port that received the packet.

19. An application specific integrated circuit (ASIC) comprising:
   a content-addressable-memory (CAM) storing a Media Access Control (MAC) address in an entry; and
   an address manager capable of accessing the CAM while the MAC address is being stored in a static random access memory (SRAM); wherein the CAM stores in the entry an indicator representing if the MAC address has been stored in the SRAM.

20. The ASIC of claim 19 wherein the CAM stores in the entry a number representing a port of a packet-forwarding device that includes the ASIC.

* * * * *